United States Patent
Koshinz et al.

(10) Patent No.: US 9,989,709 B2
(45) Date of Patent: Jun. 5, 2018

(54) METHOD FOR POLISHING END FACES OF PLASTIC OPTICAL FIBER

(71) Applicant: The Boeing Company, Chicago, IL (US)

(72) Inventors: Dennis G. Koshinz, Bellevue, WA (US); Eric Y. Chan, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 15/161,552

(22) Filed: May 23, 2016

(65) Prior Publication Data

US 2017/0336574 A1 Nov. 23, 2017

(51) Int. Cl.
*G02B 6/38* (2006.01)
*G02B 6/02* (2006.01)

(52) U.S. Cl.
CPC ....... *G02B 6/3863* (2013.01); *G02B 6/02033* (2013.01); *G02B 6/3847* (2013.01)

(58) Field of Classification Search
None
See application file for complete search history.

(56) References Cited

U.S. PATENT DOCUMENTS

| | | |
|---|---|---|
| 4,148,554 A | 4/1979 | Magnusson et al. |
| 4,695,124 A | 9/1987 | Himono et al. |
| 5,778,125 A | 7/1998 | Busse et al. |
| 5,855,503 A | 1/1999 | Csipkes et al. |
| 5,923,805 A | 7/1999 | Anderson et al. |
| 6,565,423 B1 | 5/2003 | Matsunaga et al. |
| 7,001,080 B2 | 2/2006 | Minami et al. |
| 8,128,459 B2 | 3/2012 | Ling |
| 8,708,776 B1 | 4/2014 | Frazer |
| 2013/0163930 A1* | 6/2013 | Jian .......................... G02B 6/36 385/60 |

OTHER PUBLICATIONS

Extended European Search Report dated Oct. 25, 2017 in European Application No. 17170991.8 (European counterpart of the instant application).

* cited by examiner

*Primary Examiner* — Jerry Rahll
(74) *Attorney, Agent, or Firm* — Ostrager Chong Flaherty & Broitman P.C.

(57) ABSTRACT

A process for polishing the end face of a plastic optical fiber (POF) to produce a mirror smooth surface without any defect. Smooth POF end faces reduce the optical coupling loss when two plastic optical fibers are connected. The polishing process can be used to produce POF end faces which are recessed relative to the adjacent end face of a ferrule surrounding the fiber. When the ends of two ferrules are inserted in a connector designed to align the end faces of the ferrules while allowing those end faces to abut each other, the confronting recessed POF end faces will be separated by an air gap.

18 Claims, 7 Drawing Sheets

METHOD FOR POLISHING END FACES OF PLASTIC OPTICAL FIBER

BACKGROUND

The technology disclosed herein generally relates to methods for polishing end faces of optical fibers and, more particularly, relates to polishing end faces of plastic optical fibers.

An optical fiber is a cylindrical dielectric waveguide that transmits light along its axis. The fiber consists of a transparent core surrounded by a transparent cladding layer (hereinafter "cladding"), both of which are made of dielectric materials. Light is kept in the core by the phenomenon of total internal reflection. To confine the optical signal in the core, the refractive index of the core is greater than that of the cladding. The boundary between the core and cladding may either be abrupt, as in step-index fiber, or gradual, as in graded-index fiber.

An important aspect of a fiber optic communication is that of connecting two fiber optic cables such that optical loss is minimized. Temporary or semi-permanent connections are made by means of specialized optical fiber connectors. It is often necessary to align an optical fiber with another optical fiber. This can involve either carefully aligning the fiber and placing it in contact with the device, or using a lens to allow coupling. In some cases the end of the fiber is polished into a curved form that makes it act as a lens.

A plastic optical fiber (POF) is an optical fiber that is made of polymeric materials. Similar to glass optical fiber, POF transmits light (for illumination or data) through the core of the fiber. Its chief advantage over the glass product, other aspects being equal, is its robustness under bending and stretching. Typically, the core is made of poly(methyl methacrylate) (PMMA) or polystyrene (96% of the cross section in a fiber 1 mm in diameter), while the cladding is made of silicone resin. The former have refractive indices of 1.49 and 1.59 respectively, while the latter has a refractive index ~1.46.

PMMA is a soft material and easily damaged using polishing processes typically used to polish glass optical fibers. In addition, POF has a typical diameter of 1 mm whereas glass optical fiber typically has a diameter of 0.125 mm. This difference in diameter makes it more difficult to achieve uniformity with a high-quality end face when polishing POF.

An existing solution uses a standard glass optical fiber polishing process to polish POF end faces. However, glass polishing processes produce POF end faces which are full of scratch marks, pitting and cracks. These defects give the POF connector a very high loss and render such connectors unsuitable for use in avionics POF networks and systems onboard commercial aircraft. An automatic POF polishing machine is commercially available that uses a diamond-based polisher, but this machine does not produce high-quality POF end faces due to the roughness of the diamond grit. It is useful for short-distance POF optical systems where the loss produced by the connector is not crucial for the system operation. An example of this type of application is limited to automobiles where the total POF link is 10 meters or less.

Plastic optical fiber can be substituted for copper conductors in an aircraft data bus network. For commercial avionics applications, a defect-free POF end face finish is important because the POF link length in commercial aircraft ranges from 30 to 100 meters. Exacerbating the need of low-loss POF end faces is the high operating temperature environment of commercial aircraft where the optical power budget provided by the transmitter and receiver is reduced at high operating temperature.

In some aircraft models, the avionics system comprises one or more POF converters in the forward section of the aircraft and one POF converter in the aft section of the aircraft. Each forward POF converter is connected to the aft POF converter by POF having a relatively long length. The high optical loss of the POF introduces an optical loss in the connections between the forward and aft POF converters. In addition, there are multiple POF optical connectors in the POF link. The connector loss depends on the POF end face quality. A poor POF end face can introduce an additional optical loss per connector. The provision of smooth POF end faces is important to reduce the connectors' optical coupling loss for avionics POF networks where the optical link budget is very tight due to a relatively long POF length.

There is a need for a polishing process that can produce defect-free POF end faces for use in POF networks having long POF links, such as in avionics POF networks.

SUMMARY

The subject matter disclosed in detail below is directed to a process for polishing the end face of a plastic optical fiber (POF) to produce a mirror smooth surface without any defect. Smooth POF end faces reduce the optical coupling loss when two plastic optical fibers are connected. The polishing process can be used to produce POF end faces which are recessed relative to the adjacent end face of a ferrule surrounding the fiber. When the ends of two ferrules are inserted in a connector designed to align the end faces of the ferrules while allowing those end faces to abut each other, the confronting recessed POF end faces will be separated by an air gap.

One aspect of the subject matter disclosed in detail below is a method for polishing an end face of a plastic optical fiber that is surrounded by a ferrule made of metal or ceramic, comprising: (a) concurrently abrading an end face of the plastic optical fiber and an end face of the ferrule for a first time duration using a first abrasive film comprising abrasive particles having particle sizes in a first range having upper and lower bounds; (b) after the first time duration has expired, abrading the end faces for a second time duration using a second abrasive film comprising abrasive particles having particle sizes in a second range having upper and lower bounds, wherein the upper bound of the second range is less than the lower bound of the first range; and (c) after the second time duration has expired, abrading the end faces for a third time duration using a suspension comprising abrasive particles suspended in a liquid on a surface of a polishing pad, wherein the suspended abrasive particles have particle sizes in a third range having upper and lower bounds, wherein the upper bound of the first range is less than the lower bound of the second range. The first duration is greater than the second duration, and the third duration is greater than the first duration. The foregoing method may further comprise spreading the suspension over a surface of a polishing pad that is supported by a rotatable platen, wherein the third range, the third time duration, a rotational speed of the rotatable platen, and a pressure exerted on the end face of the plastic optical fiber by the polishing pad are selected so that a depth of recession of the end face of the plastic optical fiber relative to an apex of the end face of the ferrule is at least 40 microns upon completion of step (c). Preferably, the polishing pad is made of polyurethane.

In accordance with one embodiment of the method described in the preceding paragraph, at least some of the abrasive particles of the first abrasive film comprise aluminum oxide particles having a size equal to 9 microns, at least some of the abrasive particles of the second abrasive film comprise aluminum oxide particles having a size equal to 3 microns, and at least some of the abrasive particles in the suspension comprise aluminum oxide particles having a size equal to 1 micron.

Another aspect of the subject matter disclosed in detail below is a method for polishing an end face of a plastic optical fiber that is surrounded by a ferrule made of metal or ceramic, comprising: (a) pressing an end face of the plastic optical fiber and an end face of the ferrule against a first abrasive film with a first pressure, wherein the first abrasive film comprises abrasive particles having particle sizes in a first range; (b) moving the first abrasive film relative to the end faces for a first time duration while the end faces are being pressed against the first abrasive film with the first pressure; (c) separating the end faces from the first abrasive film after the first time duration has expired; (d) pressing the end faces against a second abrasive film with a second pressure, wherein the second abrasive film comprises particles having particle sizes in a second range having an upper bound which is less than a lower bound of the first range; (e) moving the second abrasive film relative to the end faces for a second time duration while the end faces are being pressed against the second abrasive film with the second pressure; (f) separating the end faces from the second abrasive film after the second time duration has expired; (g) placing a suspension comprising abrasive particles suspended in a liquid on a surface of a polishing pad, wherein the suspended abrasive particles have particle sizes in a third range having upper bound which is less than a lower bound of the second range; (h) pressing the end faces against the polishing pad with a third pressure which is less than the first pressure and less than the second pressure; and (i) moving the polishing pad relative to the end faces for a third time duration while the end faces are being pressed against the polishing pad with the third pressure.

A further aspect of the subject matter disclosed in detail below is a fiber optic device comprising: a plastic optical fiber having a length and a polished end face; and a ferrule surrounding the plastic optical fiber along at least a portion of the length of the plastic optical fiber, the ferrule having a polished convex annular end face that defines an aperture, wherein the polished end face of the plastic optical fiber is disposed within the aperture, is recessed relative to an apex of the polished convex annular end face of the ferrule, and has a smoothness produced by abrasion using a suspension of abrasive particles applied on a surface of a polishing pad. A depth of recession of the end face of the plastic optical fiber relative to the apex of the polished convex annular end face of the ferrule is at least 40 microns. In accordance with one embodiment, the abrasive particles in the suspension have sizes in a range that includes 1 micron.

Yet another aspect a fiber optic system comprising: a first plastic optical fiber having an end portion with a polished end face; a first ferrule surrounding the end portion of the first plastic optical fiber and having an end portion with a polished end face; a second plastic optical fiber having an end portion with a polished end face; a second ferrule surrounding the end portion of the second plastic optical fiber and having an end portion with a polished end face; and a connector configured to hold the first and second ferrules in respective positions such that the polished end faces of the first and second ferrules are in contact and the end faces of the first and second optical fibers confront each other, wherein the end faces of the first and second plastic optical fibers are recessed relative to the polished end faces of the first and second ferrules respectively to form an air gap between the end faces of the first and second plastic optical fibers when the polished end faces of the first and second ferrules are in contact. The width of the air gap is at least 80 microns. The end faces of the first and second plastic optical fibers have a smoothness produced by abrasion using a suspension of abrasive particles applied on a surface of a polishing pad.

Other aspects of methods for polishing end faces of plastic optical fibers for use in systems that have long POF links are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale and the relative thicknesses of layers depicted in those diagrams does not precisely reflect the actual thicknesses.

FIG. 8 depicts the same fine polishing step depicted in FIG. 7 (albeit on a magnified scale), for the purpose of simplification, the suspension of abrasive particles wetting the surface of the polishing pad is not shown.

Reference will hereinafter be made to the drawings in which similar elements in different drawings bear the same reference numerals.

DETAILED DESCRIPTION

Illustrative embodiments of fiber optic devices and fiber optic systems are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
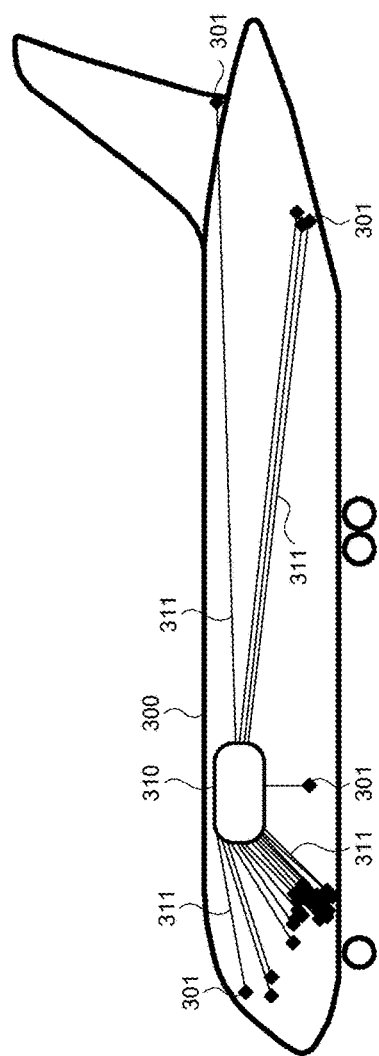
FIG. 1 is a diagram depicting a communication system that uses plastic optical fibers instead of an electrical bus to connect line replaceable units onboard an aircraft.

FIG. 1 depicts an example of an aircraft 300 that has a number of line replaceable units 301. For ease of depiction, not all of the line replaceable units 301 have been labeled. The installation of fiber optic devices and systems on an aircraft 300 is described herein for the purpose of illustration only. Implementation of the devices described herein is not limited solely to the environment of an aircraft, but rather may be utilized in fiber optic systems onboard other types of vehicles or fiber optic systems which are not onboard vehicles.

Individual line replaceable units 301 can be any component that sends and receives signals from other components. For example, line replaceable units 301 can include sensor components, flight control components, and the like. Within the aircraft 300 depicted in FIG. 1, the aircraft 300 includes a first grouping of line replaceable units 301 in the forward section of the aircraft 300 and a second grouping of line replaceable units 301 in the aft section of the aircraft 300.

FIG. 1 further depicts a communication system that uses plastic fiber optics instead of an electrical bus to interconnect the line replaceable units 301. The aircraft 300 includes an optical star coupler 310. The line replaceable units 301 are connected to optical star coupler 310 via plastic optical fibers 311. For ease of depiction, not all of the plastic optical fibers 311 have been labeled. The optical star coupler 310 can be configured to receive optical signals from each of the plastic optical fibers 311 and to transmit a combined optical signal, representing the combination of all of the optical signals received from each of the plastic optical fibers 311, back to the line replaceable units 301 via the plastic optical fibers 311. In this manner, the signals sent by each of the line replaceable units 301 are received by all of the other line replaceable units 301. Some of the line replaceable units are separated by relatively long distances. For example, one of the line replaceable units 301 near the rear of the aircraft 300 can be about 70 meters away from the optical star coupler 310.

Figure 2:
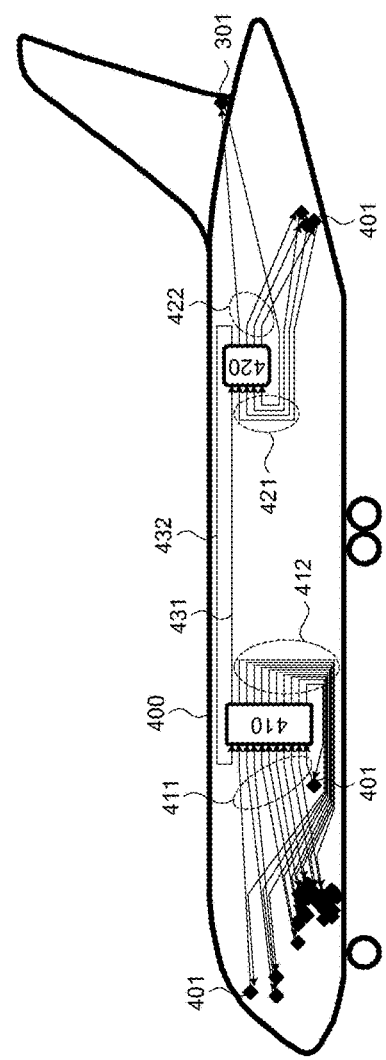
FIG. 2 is a diagram depicting an aircraft with a number of line replaceable units connected via a plastic fiber optical network having two symmetrical optical star couplers.

FIG. 2 depicts an aircraft 400 having a number of line replaceable units 401 onboard. For ease of depiction, not all of the line replaceable units 401 have been labeled. The aircraft vehicle includes a first symmetrical star coupler 410 and a second symmetrical star coupler 420. The system includes the following: (a) plastic optical fiber transmission lines 411 from each of the line replaceable units 401 in the forward section of the aircraft 400 to the first symmetrical star coupler 410; (b) plastic optical fiber receiving lines 412 connecting the first symmetrical star coupler 410 back to each of the line replaceable units 401 in the forward section of the aircraft 400; (c) plastic optical fiber transmission lines 421 from each of the line replaceable units 401 in the aft section of the aircraft 400 to the second symmetrical star coupler 420; (d) plastic optical fiber receiving lines 422 connecting the second symmetrical star coupler 420 back to each of the line replaceable units 401 in the aft section of the aircraft 400; (e) a first long plastic optical fiber transmission line 431 connecting the first symmetrical star coupler 410 to the second symmetrical star coupler 420; and (f) a second long plastic optical fiber transmission line 432 connecting the first symmetrical star coupler 410 to the second symmetrical star coupler 420.

Figure 3:
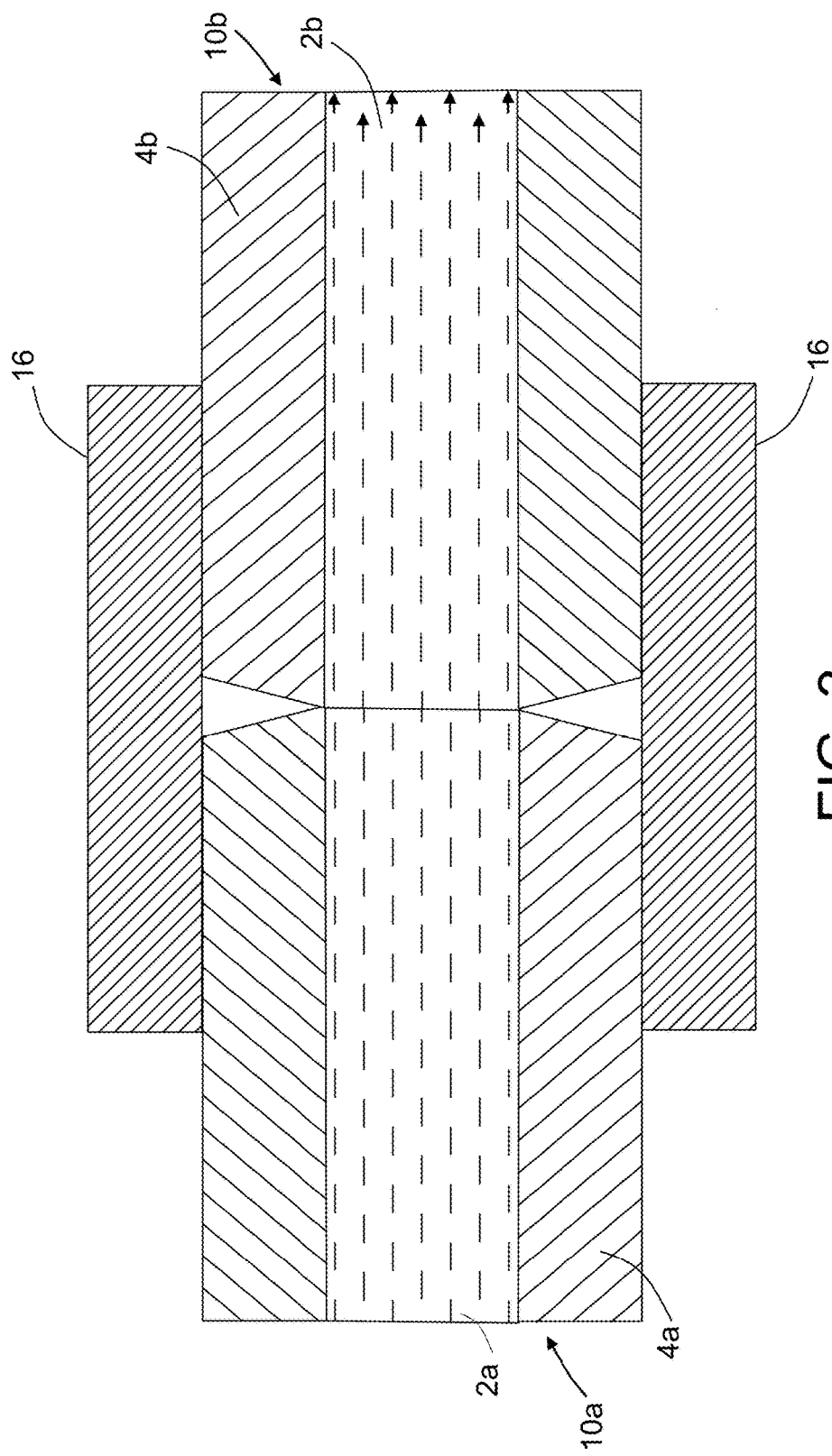
FIG. 3 is a diagram representing a sectional view of an optical coupling of two optical fibers using a connector.

Due to the long length of some of the lines depicted in FIGS. 1 and 2, it is common to use connectors to optically couple a multiplicity of shorter-length plastic optical fibers in series. FIG. 3 is a sectional view depicting an optical coupling of one end of a first fiber optic device 10a to one end of a second fiber optic device 10b using a connector 16. The first fiber optic device 10a comprises a plastic optical fiber 2a surrounded by a ferrule 4a made of metal (e.g., stainless steel or aluminum) or ceramic, while the second fiber optic device 10b comprises a plastic optical fiber 2a surrounded by a ferrule 4a made of metal or ceramic. It is well known that each plastic optical fiber depicted in FIG. 3 (and other drawings) comprises a polymeric core (e.g., PMMA) surrounded by polymeric cladding. In the example depicted in FIG. 3, the plastic optical fibers 2a and 2b have substantially the same diameter. Therefore, rays of light (represented by dashed arrows) propagating from left to right (as seen in FIG. 3) along plastic optical fiber 2a can pass into plastic optical fiber 2b with a small optical loss.

Many different types of optical fiber connectors exist and are commercially available. Accordingly, FIG. 3 does not seek to depict any particular configuration or type of optical fiber connector, but rather simply represents (in section) a generic connector as a generally circular cylindrical structure. In addition, it is well known that some connectors include springs and associated structure for urging the ends of two fiber optic devices into contact with each other. Such springs and associated structure are also not shown in FIG. 3.

The connector's optical coupling loss depends on the quality of the confronting (in this example, also abutting) end faces of the plastic optical fibers (POF) 2a and 2b. A poor POF end face can introduce an additional optical loss per connector. The provision of smooth POF end faces is important to reduce the connector's optical coupling loss for avionics POF networks where the optical link budget is very tight due to relatively long POF lengths.

During the movements of a vehicle such as an aircraft, vibrations occur in various components at various vibration amplitudes and phases. In cases where two components are in contact, vibrations can cause those components to rub against each other. In cases where the two components are made of plastic, the rubbing surfaces of the two components may become scratched or develop other defects. To avoid such damage, it is desirable to provide a fiber optic system in which an air gap is present between the confronting end faces of the plastic optical fibers 2a and 2b.

It is also desirable to provide a polishing process capable of producing defect-free end faces that will confront each other when the plastic optical fibers 2a and 2b are optically coupled together. Such a polishing process will now be described. There are many types of plastic optical fibers that can utilize this polishing process to produce defect-free end faces, including but not limited to the following: (a) 1-mm-diameter step-index single-core plastic optical fibers; (b)

1-mm multi-core plastic optical fibers; (c) 55-micron graded-index plastic optical fibers; and (d) 80-micron graded-index plastic optical fibers.

Figure 4:
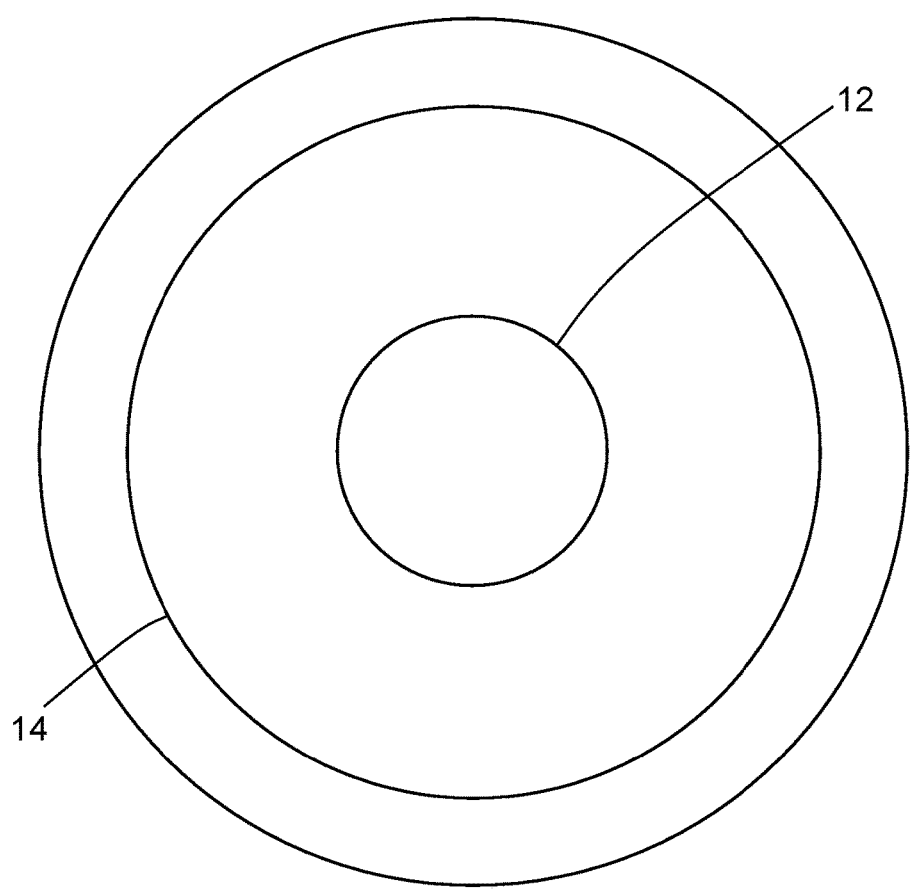
FIG. 4 is a diagram representing an end view of an end face of a fiber optic device (comprising a plastic optical fiber surrounded by a ferrule) which has been polished using a polishing process in accordance with one embodiment.

The POF end face polishing process in accordance with one embodiment provides a fiber optic device in which a polished end face of the plastic optical fiber is recessed relative to the polished end face of the surrounding ferrule. FIG. 4 is a diagram representing an end view of a fiber optic device (comprising a plastic optical fiber surrounded by a metal or ceramic ferrule) in which the end face of the fiber optic device has been polished to produce a flat mirror-like defect-free POF end face 12 (1 mm in diameter) that is recessed relative to the apex of a convex annular end face 14 of the ferrule. When two such fiber optic devices are optically coupled by means of a connector, the apices of the convex annular end faces of the ferrules will contact each other and the confronting recessed end faces of the two plastic optical fibers will be separated by an air gap (such as air gap 34 seen in FIG. 9, discussed below). This air gap prevents the polished end faces from contacting each other, thereby avoiding vibration-induced damage and associated optical coupling loss.

The polishing process disclosed herein uses an automated polishing machine such as the Model HDC-4000, which is commercially available from Domaille Engineering, LLC, Rochester, Minn. The structure and functionality of a similar automated polishing machine designed to polish end faces of optical fibers are described in detail in U.S. Pat. No. 8,708,776, which is assigned to Domaille Engineering, LLC. To avoid incorporation by reference, a brief summary of the structure and functionality of such automated polishing machines will now be provided.

Polishing machines for polishing optical fibers typically include a rotatable platen and a fixture, such as an arm, which positions and supports the optical fibers above the rotating platen during the polishing process. Typically, the end face of an optical fiber is lowered onto an abrasive film which rests on the rotatable plate and, depending upon various factors such as the particle size distribution of the abrasive film, the rotational speed of the platen, the pressure applied, and the duration of abrasion, can be polished to a suitable finish for a particular application.

Optical fiber polishing machines generally include a fixture, coupled to the mounting mechanism, that is capable of holding and gripping one or more fiber optic devices (e.g., by holding a ferrule or a connector) and advancing them under controlled conditions of speed and force to move a plurality of end faces into engagement with the rotating abrasive. The polishing unit disclosed in U.S. Pat. No. 8,708,776 comprises a pneumatic overarm assembly, a platen assembly, a processor, a porting device for a portable memory device, and an input device. The pneumatic arm assembly comprises an overarm hingedly coupled along one end of a base and rotatable about a hinge, and a mounting fixture having a number of ports for affixing optical fibers within the fixture. For example, the mounting fixture may include ports configured to hold optical fiber connectors and/or optical fiber ferrules. The platen assembly includes a rotatable platen configured to retain an abrasive film or polishing pad for polishing the end faces of fiber optic devices being held by the mounting fixture. The rotatable platen is also movable in an eccentric fashion with respect to the mounting fixture. For example, in some cases the platen rotates about the axis of the platen, while the platen axis revolves along a circular path which is centered at the center of the mounting fixture. Thus, end faces of fiber optic devices fixed within the mounting fixture are polished or ground against an abrasive film on the platen as the platen moves relative to the mounting fixture.

In accordance with the polishing process disclosed herein, the above-described automated polishing machine is operated with selected time durations, selected pressures, and selected platen rotational speeds. Any connector type and ferrule type can be used for this process, including adhesive or crimp style connectors. Different types of connectors and ferrules will require a specific mounting fixture to hold the connector or ferrule during the polishing process. The connectors are attached to the mounting fixture and then the mounting fixture with POF connectors is positioned above the rotatable platen on the polishing machine.

In accordance with one embodiment, the first step of the polishing process is a relatively coarse polishing step (hereinafter "coarse polishing") using 9-micron aluminum oxide abrasive film to abrade the end faces of the plastic optical fiber and the surrounding ferrule. Initially, the polishing machine is configured so that a selected first pressure (e.g., 3.0 lbs) will be exerted by the arm that supports the mounting fixture while the rotatable platen 20 will be rotated at a selected first speed (e.g., 230 rpm) for a selected first time duration (e.g., 30 sec). Before coarse polishing, the starting end face of the fiber optic device 10 is generally flat except for a chamfer located along the outer circumference of the end face of ferrule 4.

Figure 5:
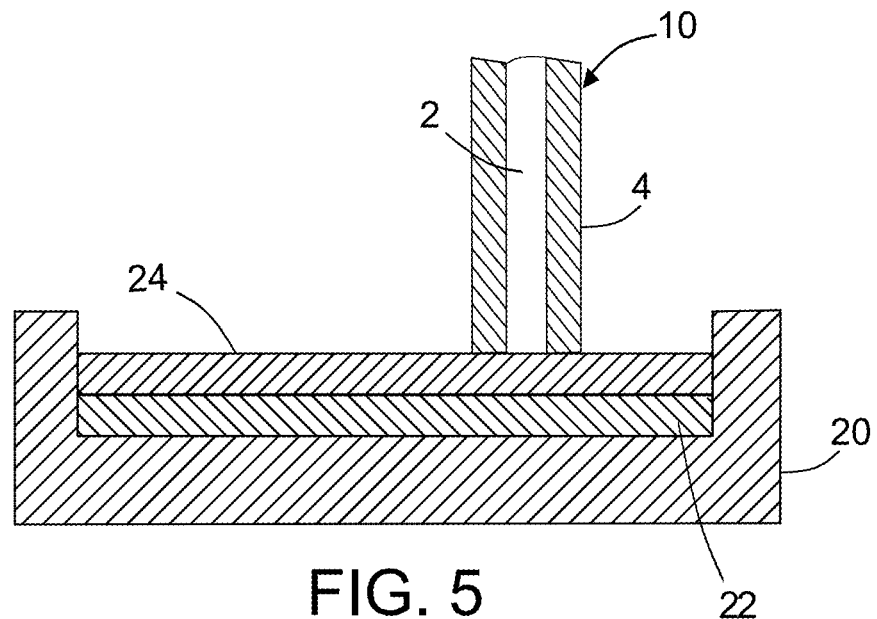
FIG. 5 is a diagram representing a sectional view of a fiber optic device whose end face is being polished using a 9-micron abrasive film during a coarse polishing step in accordance with one embodiment.

FIG. 5 is a diagram representing a sectional view of a fiber optic device 10 (comprising a plastic optical fiber 2 surrounded by a ferrule 4) whose end face is being polished using a 9-micron aluminum oxide abrasive film 24 during coarse polishing. The 9-micron aluminum oxide abrasive film 24 lies on top of a rubber pad 22, which rubber pad 22 in turn lies on top of a rotatable platen 20. For the purpose of simplification, deflection of the 9-micron aluminum oxide abrasive film 24 due to the pressure exerted by the end face of the fiber optic device 10 on the underlying rubber pad 22 is not shown. The 9-micron aluminum oxide abrasive film 24 may comprise a Mylar film having particles made of aluminum oxide adhered to one side of the Mylar film by a layer of resin. It should be appreciated that abrasive particles made from materials other than aluminum oxide can be used.

As used herein, the term, "N-micron abrasive film" means a layer of film having abrasive particles adhered to one side, which abrasive particles have sizes distributed over a range having upper and lower bounds, which range includes the particle size equal to N microns. In the step depicted in FIG. 5, N=9. As will be discussed later, N=3 in the step depicted in FIG. 6. The value N may represent an estimated mean, average, median or predominant particle size of a distribution of particle sizes incorporated in the abrasive film.

Referring again to FIG. 5, during the coarse polishing step, the end face of the plastic optical fiber 2 and the end face of the ferrule 4 are pressed against the 9-micron aluminum oxide abrasive film 24 with the first pressure. While the first pressure is being applied, the rotatable platen 20 is rotated and oscillated for the first time duration, during which the 9-micron aluminum oxide abrasive film 24 moves relative to and abrades the end faces. Following the expiration of the first time duration, the rotation and oscillation of the rotatable platen 20 are stopped and the end faces of plastic optical fiber 2 and ferrule 4 are separated from the 9-micron aluminum oxide abrasive film 24. The system operator then inspects the end faces, including verifying that the end face of plastic optical fiber 2 is even with or barely protruding from the end face of ferrule 4. It is expected and acceptable that the end face of the plastic optical fiber 2 will have grind marks made by the 9-micron aluminum oxide abrasive film 24.

If the end faces pass inspection, then the second step of the process is performed. The second step of the polishing process is an intermediate (neither coarse nor fine) polishing step (hereinafter "intermediate polishing") using 3-micron aluminum oxide abrasive film to further abrade the end faces of the plastic optical fiber 2 and ferrule 4. The polishing machine is reconfigured so that a selected second pressure (e.g., 3.0 lbs) will be exerted by the arm that supports the mounting fixture while the rotatable platen 20 will be rotated at a selected second speed (e.g., 120 rpm) for a selected second time duration (e.g., 10 sec).

Figure 6:
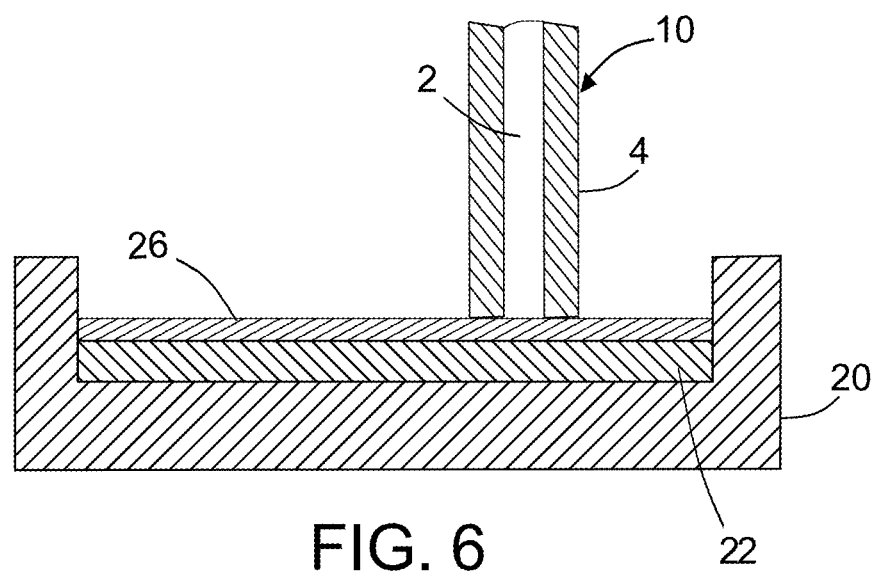
FIG. 6 is a diagram representing a sectional view of a fiber optic device whose end face is being polished using a 3-micron abrasive film during an intermediate polishing step following the coarse polishing step depicted in FIG. 5.

To transition from coarse polishing to intermediate polishing, the 9-micron aluminum oxide abrasive film 24 is removed from the rubber pad 22 and replaced by a 3-micron aluminum oxide abrasive film 26, shown in FIG. 6. During intermediate polishing, the end face of the fiber optic device 10 is polished using the 3-micron aluminum oxide abrasive film 26. For the purpose of simplification, deflection of the 3-micron aluminum oxide abrasive film 26 due to the pressure exerted by the end face of the fiber optic device 10 on the underlying rubber pad 22 is not shown.

Still referring again to FIG. 6, during the intermediate polishing step, the end faces of plastic optical fiber 2 and ferrule 4 are pressed against the 3-micron aluminum oxide abrasive film 26 with the second pressure. While the second pressure is being applied, the rotatable platen 20 is rotated and oscillated for the second time duration, during which the 3-micron aluminum oxide abrasive film 26 moves relative to and abrades the end faces. Following the expiration of the second time duration, the rotation and oscillation of the rotatable platen 20 are stopped and the end faces of plastic optical fiber 2 and ferrule 4 are separated from the 3-micron aluminum oxide abrasive film 26. The abrasive particle size, pressure, rotational speed and time duration employed during intermediate polishing are selected so that all of the grind marks created by the 9-micron aluminum oxide abrasive film are removed from the end face of the plastic optical fiber 2.

Upon completion of the intermediate processing, the third step of the process is performed. The third step of the polishing process is a relatively fine polishing step (hereinafter "fine polishing") using a colloidal suspension of 1-micron aluminum oxide abrasive particles suspended in water to further abrade the end faces of plastic optical fiber 2 and ferrule 4. The polishing machine is reconfigured so that a selected third pressure (e.g., 1.5 lbs) will be exerted by the arm that supports the mounting fixture while the rotatable platen 20 will be rotated at a selected third speed (e.g., 80 rpm) for a selected third time duration (e.g., 1 min).

To transition from intermediate polishing to fine polishing, the rubber pad 22 and the 3-micron aluminum oxide abrasive film 26 (shown in FIG. 6) are removed from the rotatable platen 20 and replaced by a glass plate 28 and a polishing pad 30, as will now be described in more detail with reference to FIG. 7.

Figure 7:
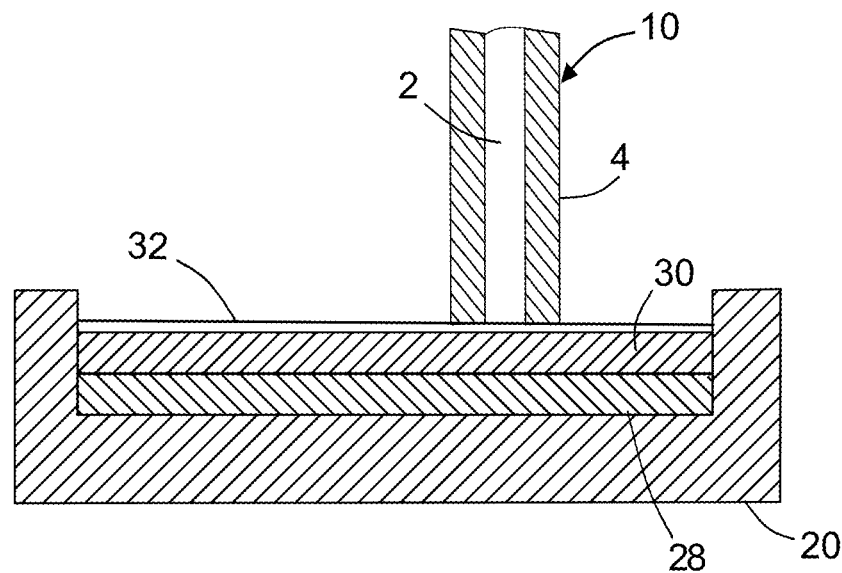
FIG. 7 is a diagram representing a sectional view of a fiber optic device whose end face is being polished using abrasive particles suspended in liquid on a polishing pad during a fine polishing step following the intermediate polishing step depicted in FIG. 6. The thickness of the suspension has been exaggerated for the sake of illustration.

FIG. 7 is a diagram representing a sectional view of the apparatus for fine polishing of the end face of the fiber optic device 10. First, a glass plate 28 is placed on the rotatable platen 20. Then a polishing pad 30 made of a resilient material (e.g., polyurethane) is placed on top of the glass plate 30. Lastly, the surface of a polishing pad 30 is wetted with a thin film of a colloidal suspension 32 comprising 1-micron aluminum oxide abrasive particles suspended in water. In FIG. 7, the thickness of the film has been exaggerated for the sake of illustration. During fine polishing, the end face of fiber optic device 10 is polished using the colloidal suspension 32. For the purpose of simplification, deflection of the polishing pad 30 due to the pressure exerted by the end face of the fiber optic device 10 is not shown.

Figure 8:
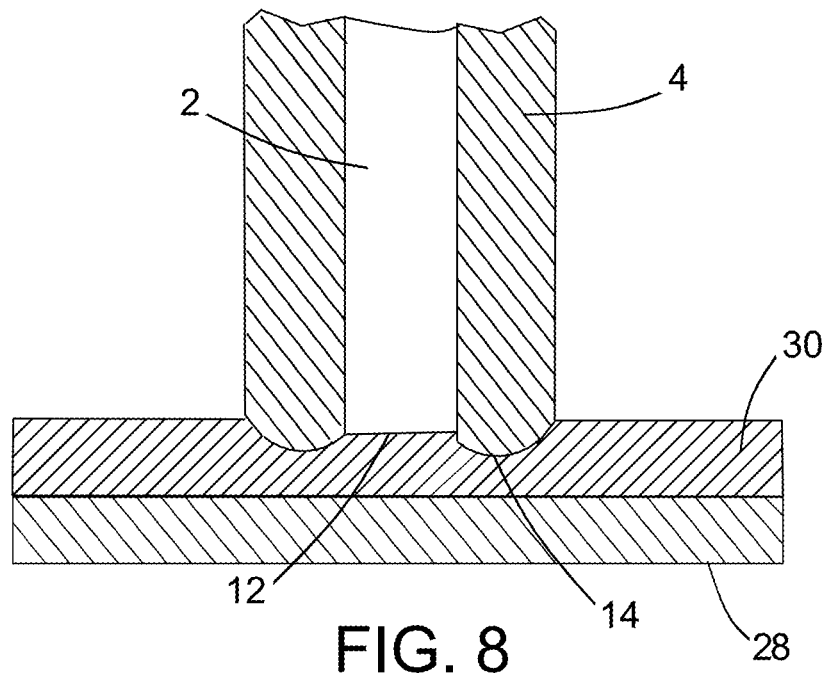
FIG. 8 is a diagram representing a sectional view of a fiber optic device whose end face is being polished using a suspension of abrasive particles. Although

FIG. 8 is a diagram representing a sectional view of a fiber optic device 10 whose end face is being polished using a suspension of 1-micron aluminum oxide abrasive particles. Although FIG. 8 depicts the same fine polishing step depicted in FIG. 7 (albeit on a magnified scale), for the purpose of simplification, the extremely thin film of suspended abrasive particles wetting the surface of the polishing pad is not shown. FIG. 8 depicts deflection of the polishing pad 30 due to the pressure exerted by the end face 14 of ferrule 4 and the pressure exerted by the end face 12 of plastic optical fiber 2.

Referring again to FIG. 7, during the fine polishing step, the end faces of plastic optical fiber 2 and ferrule 4 are pressed against the polishing pad 30 (with intervening 1-micron aluminum oxide abrasive particles) with the third pressure. While the third pressure is being applied, the rotatable platen 20 is rotated and oscillated for the third time duration, during which the 1-micron aluminum oxide abrasive particles in the suspension 32 move relative to and abrade the end faces. During the fine polishing step, a recessed smooth (i.e., defect-free) end face of the plastic optical fiber 2 and a convex annular end face of the ferrule 4 are formed (as seen in FIG. 4). The polished end face of the plastic optical fiber 2 is recessed relative to an apex or crown of the convex annular end face of the ferrule 4. The abrasive particle size, pressure, rotational speed and time duration employed during fine polishing are selected so that a desired depth of recession is achieved. Preferably, the depth of recession is at least 40 microns. Following the expiration of the third time duration, the rotation and oscillation of the rotatable platen 20 are stopped, and the end faces of plastic optical fiber 2 and ferrule 4 are separated from polishing pad 30.

Upon completion of the fine polishing step, the fiber optic device 10 is removed from the polishing machine. Optionally, the end face of the plastic optical fiber 2 can be inspected to ensure that its smoothness is within applicable manufacturing tolerances or engineering specifications.

The polishing parameters in accordance with one implementation of the above-described method are listed in the following table:

TABLE

| Step Number | Al$_2$O$_3$ Particle Size (μm) | Duration (seconds) | Speed (rpm) | Pressure (psi) |
| --- | --- | --- | --- | --- |
| 1 | 9 | 30 | 230 | 3.0 |
| 2 | 3 | 10 | 120 | 3.0 |
| 3 | 1 | 60 | 80 | 1.5 |

The fine polishing step creates the recessed fiber end face. By using a polishing pad 30 attached to a flat glass plate 28 and applying a 1-micron aluminum oxide polishing suspension 32 to the polishing pad 30, a recessed polished plastic optical fiber end face 12 can be created. By changing the process parameters (time/speed/pressure), the depth of recession can be varied to produce a desired connector air gap. Also, the size distributions of the abrasive particles employed in the coarse, intermediate and fine polishing steps can be varied. For example, the distribution of sizes of the suspended abrasive particles used in the fine polishing step need not have an average, mean, medium or predominant size precisely equal to 1 micron.

Figure 9:
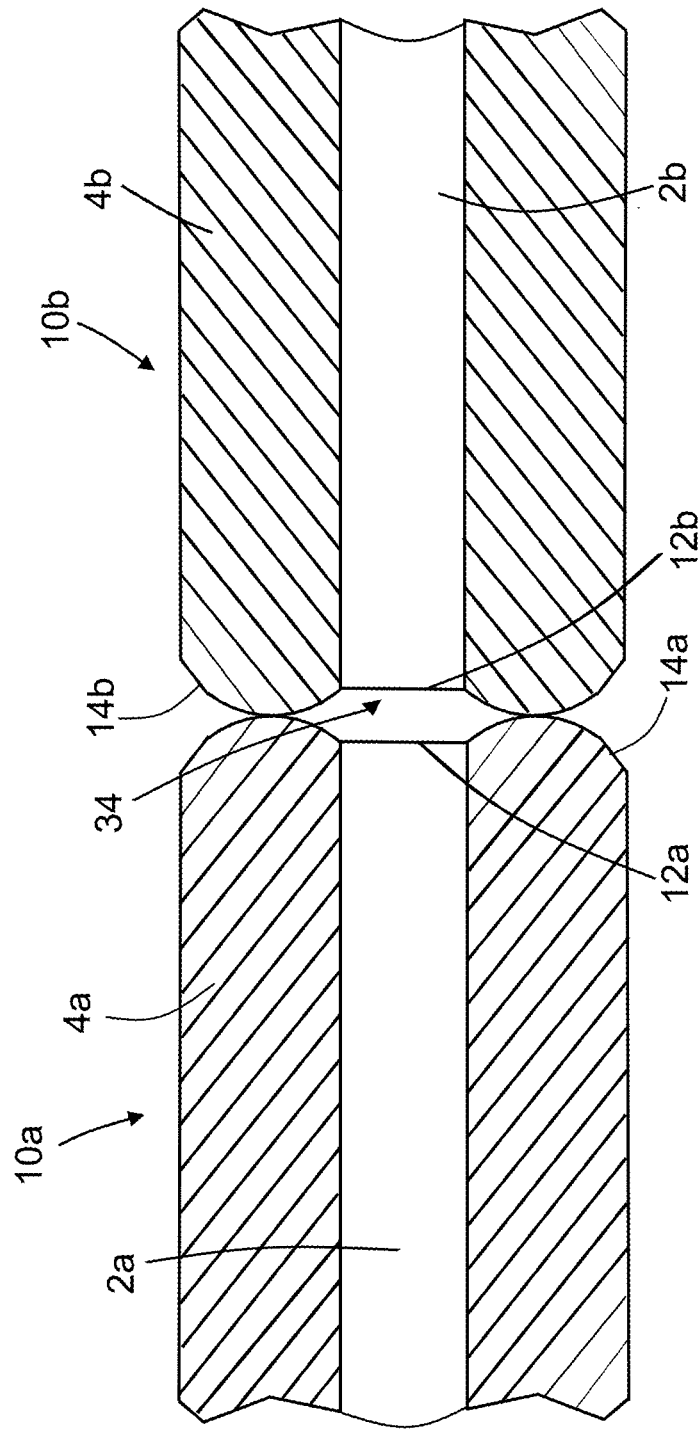
FIG. 9 is a diagram representing a sectional view of an optical coupling of two plastic optical fibers having end faces which have been polished using the process disclosed herein. The connector is not shown in FIG. 9.

FIG. 9 is a diagram representing a sectional view of an optical coupling of two plastic optical fibers 2a and 2b having respective end faces 12a and 12b which have been polished using the process disclosed herein. The connector that connects the fiber optic device 10a to the fiber optic device 10b is not shown in FIG. 9. However, that connector can be provided with spring-loaded mechanisms which urge the respective end faces 14a and 14b of ferrules 4a and 4b into contact with each other. Because the plastic optical fibers 2a and 2b have respective recessed end faces 12a and 12b, an air gap 34 will be formed when the fiber optic devices 10a and 10b are mated together. If the depth of recession is d, then the width of the air gap 34 will be equal to 2d.

Figure 10:
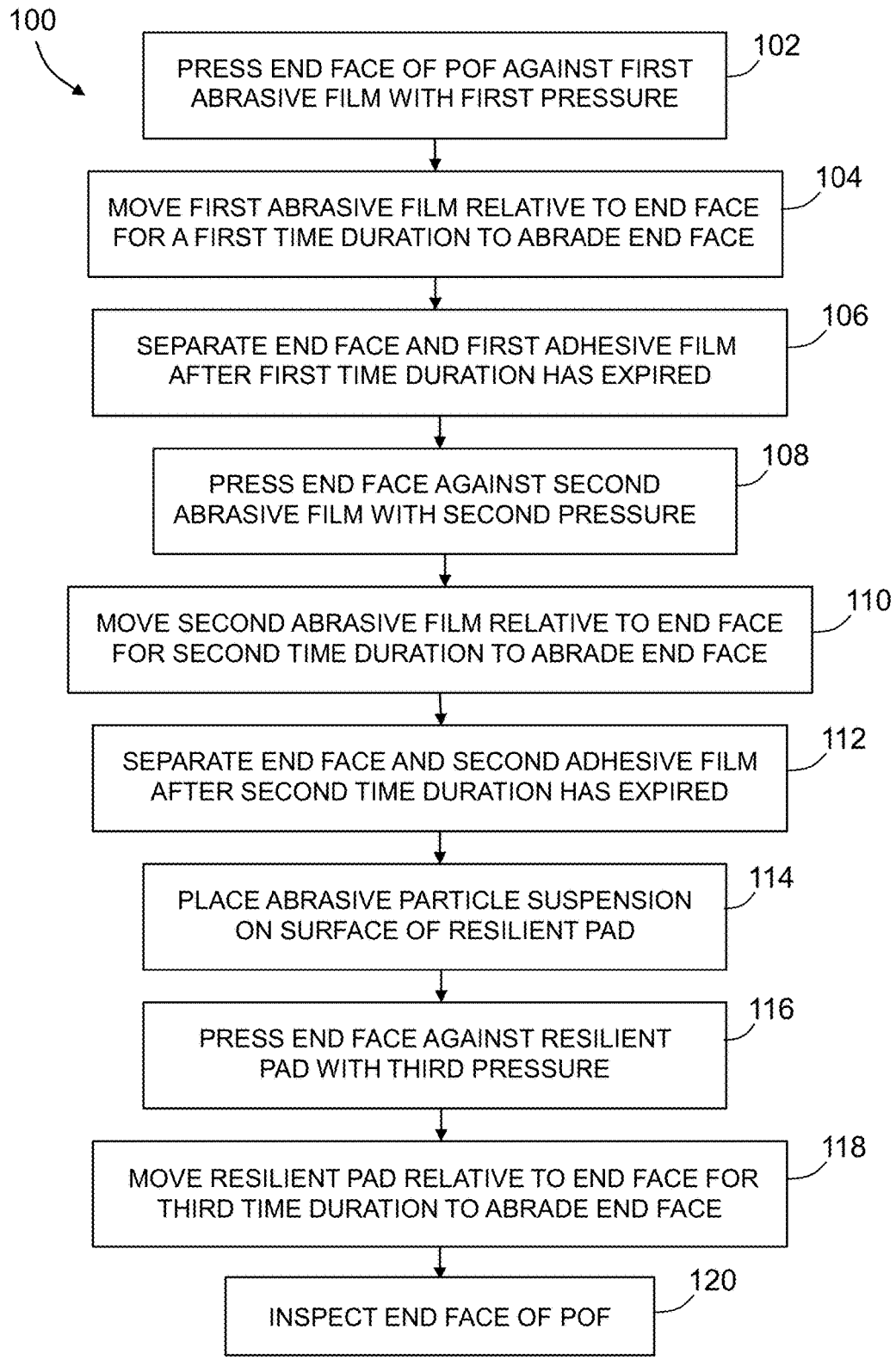
FIG. 10 is a flowchart identifying steps of a method for polishing end faces of plastic optical fibers in accordance with one embodiment.

FIG. 10 is a flowchart identifying the steps of a method 100 for polishing end faces of plastic optical fibers in accordance with one embodiment. For coarse polishing, an end face of the plastic optical fiber and an end face of the ferrule are pressed against a first abrasive film with a first pressure (step 102), wherein the first abrasive film comprises abrasive particles having particle sizes in a first range. Then the first abrasive film is moved relative to the end faces for a first time duration (step 104) while the end faces are being pressed against the first abrasive film with the first pressure, thereby abrading the end faces. The end faces are separated from the first abrasive film after the first time duration has expired (step 106). Coarse polishing is followed by intermediate polishing. For intermediate polishing, the end faces are pressed against a second abrasive film with a second pressure (step 108), wherein the second abrasive film comprises particles having particle sizes in a second range having an upper bound which is less than a lower bound of the first range. Then the second abrasive film is moved relative to the end faces for a second time duration (step 110) while the end face is being pressed against the second abrasive film with the second pressure, thereby further abrading the end faces. The end faces are separated from the second abrasive film after the second time duration has expired (step 112). Intermediate polishing is followed by fine polishing. For fine polishing, a suspension comprising abrasive particles suspended in a liquid is placed on a surface of a polishing pad (step 114), wherein the suspended abrasive particles have particle sizes in a third range having upper bound which is less than a lower bound of the second range. Then the end faces are pressed against the polishing pad with a third pressure which is less than the first pressure and less than the second pressure (step 116). Thereafter the polishing pad is moved relative to the end faces for a third time duration (step 118) while the end face is being pressed against the polishing pad with the third pressure, thereby further abrading the end faces. Finally, the end face of the plastic optical fiber is inspected (step 120).

The polishing process disclosed herein can be employed to produce defect-free POF end faces, which has the benefit of enabling the provision of very low-loss POF connector interfaces for avionics networks used in commercial or military aircraft.

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The invention claimed is:

1. A method for polishing an end face of a plastic optical fiber that is surrounded by a ferrule made of metal or ceramic, comprising:
   (a) concurrently abrading an end face of the plastic optical fiber and an end face of the ferrule for a first time duration using a first abrasive film comprising abrasive particles having particle sizes in a first range having upper and lower bounds;
   (b) after the first time duration has expired, abrading the end faces for a second time duration using a second abrasive film comprising abrasive particles having particle sizes in a second range having upper and lower bounds, wherein the upper bound of the second range is less than the lower bound of the first range; and
   (c) after the second time duration has expired, abrading the end faces for a third time duration using a suspension comprising abrasive particles suspended in water on a surface of a polishing pad made of resilient material, wherein the suspended abrasive particles have particle sizes in a third range having upper and lower bounds, wherein the upper bound of the first range is less than the lower bound of the second range.

2. The method as recited in claim 1, further comprising spreading the suspension over a surface of a polishing pad that is supported by a rotatable platen, wherein the third range, the third time duration, a rotational speed of the rotatable platen, and a pressure exerted on the end face of the plastic optical fiber by the polishing pad are selected so that a depth of recession of the end face of the plastic optical fiber relative to an apex of the end face of the ferrule is at least 40 microns upon completion of step (c).

3. The method as recited in claim 2, wherein the polishing pad is made of polyurethane.

4. The method as recited in claim 1, wherein the first duration is greater than the second duration, and the third duration is greater than the first duration.

5. The method as recited in claim 1, wherein at least some of the abrasive particles of the first abrasive film comprise abrasive particles having a size equal to 9 microns, at least some of the abrasive particles of the second abrasive film comprise abrasive particles having a size equal to 3 microns, and at least some of the abrasive particles in the suspension comprise particles having a size equal to 1 micron.

6. The method as recited in claim 5, wherein the abrasive particles of the first and second abrasive films and in the suspension are made of aluminum oxide.

7. The method as recited in claim 1, wherein at least some of the abrasive particles in the suspension comprise aluminum oxide particles having a size equal to 1 micron.

8. The method as recited in claim 1, wherein the third pressure is less than the first pressure and less than the second pressure.

9. The method as recited in claim 1, wherein step (a) comprises rotating the first abrasive film at a first speed while the end faces are stationary, step (b) comprises rotating the second abrasive film at a second speed while the end faces are stationary, and step (c) comprises rotating the polishing pad at a third speed while the end faces are stationary, the first speed being greater than the second speed, and the third speed being less than the second speed.

10. A method for polishing an end face of a plastic optical fiber that is surrounded by a ferrule made of metal or ceramic, comprising:

(a) pressing an end face of the plastic optical fiber and an end face of the ferrule against a first abrasive film with a first pressure, wherein the first abrasive film comprises abrasive particles having particle sizes in a first range;

(b) moving the first abrasive film relative to the end faces for a first time duration while the end faces are being pressed against the first abrasive film with the first pressure;

(c) separating the end faces from the first abrasive film after the first time duration has expired;

(d) pressing the end faces against a second abrasive film with a second pressure, wherein the second abrasive film comprises particles having particle sizes in a second range having an upper bound which is less than a lower bound of the first range;

(e) moving the second abrasive film relative to the end faces for a second time duration while the end faces are being pressed against the second abrasive film with the second pressure;

(f) separating the end faces from the second abrasive film after the second time duration has expired;

(g) placing a suspension comprising abrasive particles suspended in water on a surface of a polishing pad made of resilient material, wherein the suspended abrasive particles have particle sizes in a third range having upper bound which is less than a lower bound of the second range;

(h) pressing the end faces against the polishing pad with a third pressure which is less than the first pressure and less than the second pressure; and (i) moving the polishing pad relative to the end faces for a third time duration while the end faces are being pressed against the polishing pad with the third pressure.

11. The method as recited in claim 10, wherein step (g) comprises spreading the suspension over a surface of a polishing pad that is supported by a rotatable platen, wherein the third range, the third time duration, a rotational speed of the rotatable platen, and a pressure exerted on the end face of the plastic optical fiber by the polishing pad are selected so that a depth of recession of the end face of the plastic optical fiber relative to an apex of the is at least 40 microns upon completion of step (c).

12. The method as recited in claim 11, wherein the polishing pad is made of polyurethane.

13. The method as recited in claim 10, wherein the first duration is greater than the second duration, and the third duration is greater than the first duration.

14. The method as recited in claim 10, wherein at least some of the abrasive particles of the first abrasive film comprise abrasive particles having a size equal to 9 microns, at least some of the abrasive particles of the second abrasive film comprise abrasive particles having a size equal to 3 microns, and at least some of the abrasive particles in the suspension comprise abrasive particles having a size equal to 1 micron.

15. The method as recited in claim 10, wherein step (b) comprises rotating the first abrasive film at a first speed while the end faces are stationary, step (e) comprises rotating the second abrasive film at a second speed while the end faces are stationary, and step (i) comprises rotating the polishing pad at a third speed while the end faces are stationary, the first speed being greater than the second speed, and the third speed being less than the second speed.

16. A fiber optic device comprising:
a plastic optical fiber having a length and a polished end face; and
a ferrule surrounding the plastic optical fiber along at least a portion of the length of the plastic optical fiber, the ferrule having a polished convex annular end face that defines an aperture,
wherein the polished end face of the plastic optical fiber is disposed within the aperture, is recessed relative to an apex of the polished convex annular end face of the ferrule, and has a smoothness produced by abrasion using a suspension of abrasive particles applied on a surface of a polishing pad, and
wherein a depth of recession of the end face of the plastic optical fiber relative to the apex of the polished convex annular end face of the ferrule is at least 40 microns.

17. The fiber optic device as recited in claim 16, wherein the abrasive particles in the suspension have sizes in a range that includes 1 micron.

18. A fiber optic system comprising:
a first plastic optical fiber having an end portion with a polished end face;
a first ferrule surrounding the end portion of the first plastic optical fiber and having an end portion with a polished end face;
a second plastic optical fiber having an end portion with a polished end face;
a second ferrule surrounding the end portion of the second plastic optical fiber and having an end portion with a polished end face; and
a connector configured to hold the first and second ferrules in respective positions such that the polished end faces of the first and second ferrules are in contact and the end faces of the first and second optical fibers confront each other,
wherein the end faces of the first and second plastic optical fibers have a smoothness produced by abrasion and are recessed relative to the polished end faces of the first and second ferrules respectively to form an air gap between the end faces of the first and second plastic optical fibers when the polished end faces of the first and second ferrules are in contact, and
wherein a width of the air gap is at least 80 microns.

* * * * *

UNITED STATES PATENT AND TRADEMARK OFFICE
CERTIFICATE OF CORRECTION

| | | |
|---|---|---|
| PATENT NO. | : 9,989,709 B2 | Page 1 of 1 |
| APPLICATION NO. | : 15/161552 | |
| DATED | : June 5, 2018 | |
| INVENTOR(S) | : Dennis G. Koshinz and Eric Y. Chan | |

It is certified that error appears in the above-identified patent and that said Letters Patent is hereby corrected as shown below:

In the Claims

Column 12, Line 25, delete "first" and insert --third-- in its place.

Signed and Sealed this
Twenty-first Day of April, 2020

Andrei Iancu
*Director of the United States Patent and Trademark Office*